United States Patent [19]

McCartan

[11] Patent Number: 5,782,040
[45] Date of Patent: Jul. 21, 1998

[54] BREAKAWAY SIGN POST REPAIR SYSTEM

[76] Inventor: Dean McCartan, 705 Locust St., Rolfe, Iowa 50581

[21] Appl. No.: 696,036

[22] Filed: Aug. 13, 1996

[51] Int. Cl.⁶ ............................................. E04B 1/00
[52] U.S. Cl. .................. 52/98; 52/302.5; 52/726.3; 40/607; 403/2
[58] Field of Search ...................... 52/98–100, 165, 52/296, 298, 302.5, 726.3, 726.4; 403/2; 256/1, 13.1; 40/607, 612; 248/909

[56] References Cited

U.S. PATENT DOCUMENTS

| 239,080 | 3/1881 | Baker | 52/302.5 X |
|---|---|---|---|
| 843,762 | 2/1907 | Muller | 52/302.5 X |
| 1,463,715 | 7/1923 | Muhlow | 52/302.5 X |
| 1,523,977 | 1/1925 | Pillar | 52/302.5 X |
| 3,820,906 | 6/1974 | Katt | 40/607 X |
| 4,092,079 | 5/1978 | Swanson | 52/726.4 X |
| 4,737,048 | 4/1988 | Herrstrom | 403/2 X |
| 4,926,592 | 5/1990 | Nehls | 52/98 X |
| 5,160,111 | 11/1992 | Hugron | 52/98 X |
| 5,425,593 | 6/1995 | Buehler | 404/10 X |
| 5,535,555 | 7/1996 | Boyd et al. | 52/99 |

Primary Examiner—Lanna Mai

[57] ABSTRACT

A new Breakaway Sign Post Repair System for reusing a broken sign post thereby reducing the cost to repair the broken post while providing a breakaway post that will produce less damage to vehicles and people if a vehicle should hit the sign post. The inventive device includes a sign post cut into an upper post and a lower post, and a breakaway tube with a concentric horizontal partition forming an upper lumen and a lower lumen which capture the respective portion of the sign post, where the break away tube is constructed from a material that breaks concentrically.

2 Claims, 3 Drawing Sheets

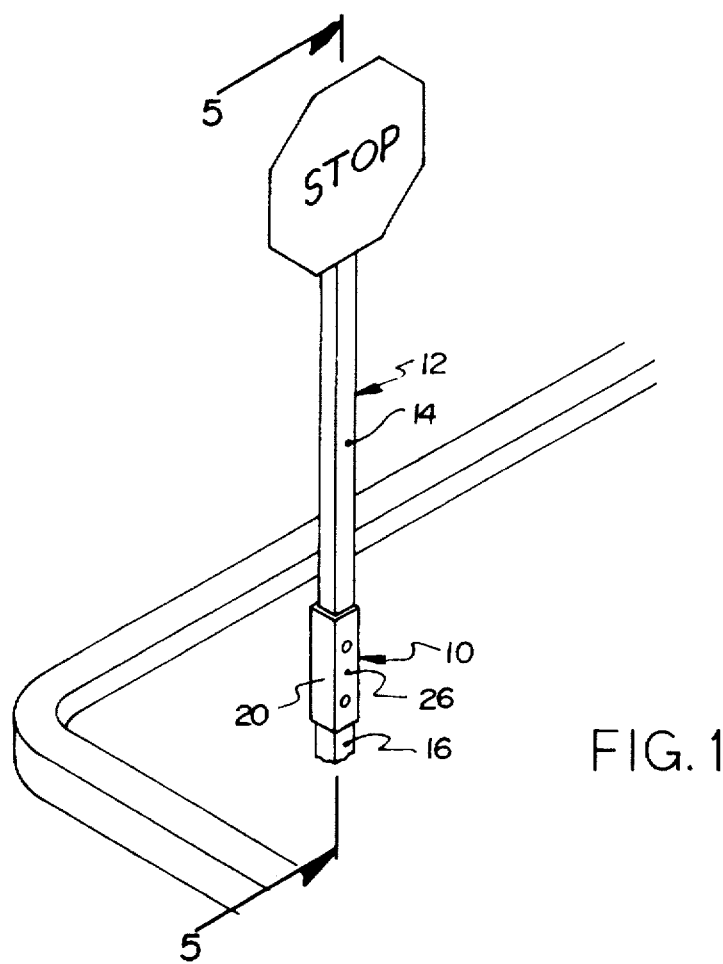
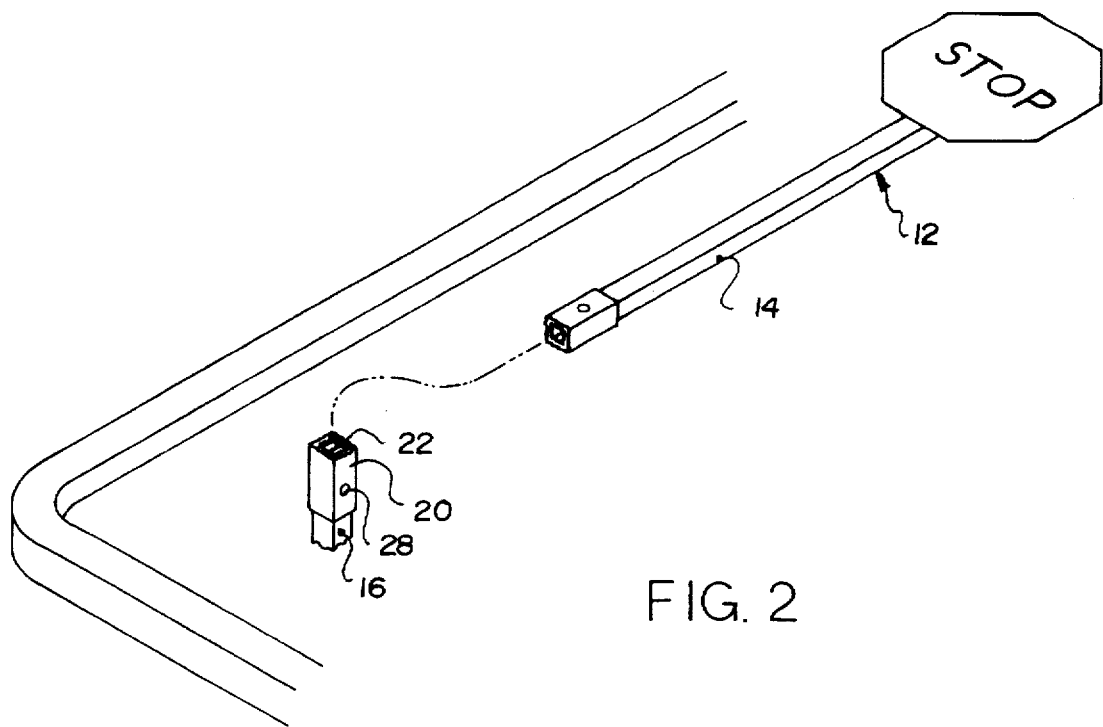

BREAKAWAY SIGN POST REPAIR SYSTEM

BACKGROUND OF THE INVENTION

1. Field of the Invention

The present invention relates to Sign Post Devices and more particularly pertains to a new Breakaway Sign Post Repair System for reusing a broken sign post thereby reducing the cost to repair the broken post while providing a breakaway post that will produce less damage to vehicles and people if a vehicle should hit the sign post.

2. Description of the Prior Art

The use of Sign Post Devices is known in the prior art. More specifically, Sign Post Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Sign Post Devices include U.S. Pat. No. 5,027,575; U.S. Pat. No. 4,926,592; U.S. Pat. No. 4,928,446; U.S. Pat. No. 5,125,194; U.S. Pat. No. 4,923,319 and U.S. Pat. No. 3,967,906.

While these devices fulfill their respective, particular objectives and requirements, the aforementioned patents do not disclose a new Breakaway Sign Post Repair System. The inventive device includes a sign post cut into an upper post and a lower post, and a breakaway tube with a concentric horizontal partition forming an upper lumen and a lower lumen which capture the respective portion of the sign post, where the break away tube is constructed from a material that breaks concentrically.

In these respects, the Breakaway Sign Post Repair System according to the present invention substantially departs from the conventional concepts and designs of the prior art, and in so doing provides an apparatus primarily developed for the purpose of reusing a broken sign post thereby reducing the cost to repair the broken post while providing a breakaway post that will produce less damage to vehicles and people if a vehicle should hit the sign post.

SUMMARY OF THE INVENTION

In view of the foregoing disadvantages inherent in the known types of Sign Post Devices now present in the prior art, the present invention provides a new Breakaway Sign Post Repair System construction wherein the same can be utilized for reusing a broken sign post thereby reducing the cost to repair the broken post while providing a breakaway post that will produce less damage to vehicles and people if a vehicle should hit the sign post.

The general purpose of the present invention, which will be described subsequently in greater detail, is to provide a new Breakaway Sign Post Repair System apparatus and method which has many of the advantages of the Sign Post Devices mentioned heretofore and many novel features that result in a new Breakaway Sign Post Repair System which is not anticipated, rendered obvious, suggested, or even implied by any of the prior art Sign Post Devices, either alone or in any combination thereof.

To attain this, the present invention generally comprises a sign post cut into an upper post and a lower post, and a breakaway tube with a concentric horizontal partition forming an upper lumen and a lower lumen which capture the respective portion of the sign post, where the break away tube is constructed from a material that breaks concentrically.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Breakaway Sign Post Repair System apparatus and method which has many of the advantages of the Sign Post Devices mentioned heretofore and many novel features that result in a new Breakaway Sign Post Repair System which is not anticipated, rendered obvious, suggested, or even implied by any of the prior art Sign Post Devices, either alone or in any combination thereof.

It is another object of the present invention to provide a new Breakaway Sign Post Repair System which may be easily and efficiently manufactured and marketed.

It is a further object of the present invention to provide a new Breakaway Sign Post Repair System which is of a durable and reliable construction.

An even further object of the present invention is to provide a new Breakaway Sign Post Repair System which is susceptible of a low cost of manufacture with regard to both materials and labor, and which accordingly is then susceptible of low prices of sale to the consuming public, thereby making such Breakaway Sign Post Repair System economically available to the buying public.

Still yet another object of the present invention is to provide a new Breakaway Sign Post Repair System which provides in the apparatuses and methods of the prior art some of the advantages thereof, while simultaneously overcoming some of the disadvantages normally associated therewith.

Still another object of the present invention is to provide a new Breakaway Sign Post Repair System for reusing a broken sign post thereby reducing the cost to repair the broken post while providing a breakaway post that will produce less damage to vehicles and people if a vehicle should hit the sign post.

Yet another object of the present invention is to provide a new Breakaway Sign Post Repair System which includes a sign post cut into an upper post and a lower post, and a breakaway tube with a concentric horizontal partition forming an upper lumen and a lower lumen which capture the respective portion of the sign post, where the break away tube is constructed from a material that breaks concentrically.

Still yet another object of the present invention is to provide a new Breakaway Sign Post Repair System that eliminates the need to purchase new posts when the broken posts may be reused thereby saving time and money.

Even still another object of the present invention is to provide a new Breakaway Sign Post Repair System that is constructed to breakaway when struck by a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new Breakaway Sign Post Repair System securing a sign post according to the present invention.

FIG. 2 is a perspective view of the breakaway tube broken concentrically.

DESCRIPTION OF THE PREFERRED EMBODIMENT

Figure 3:
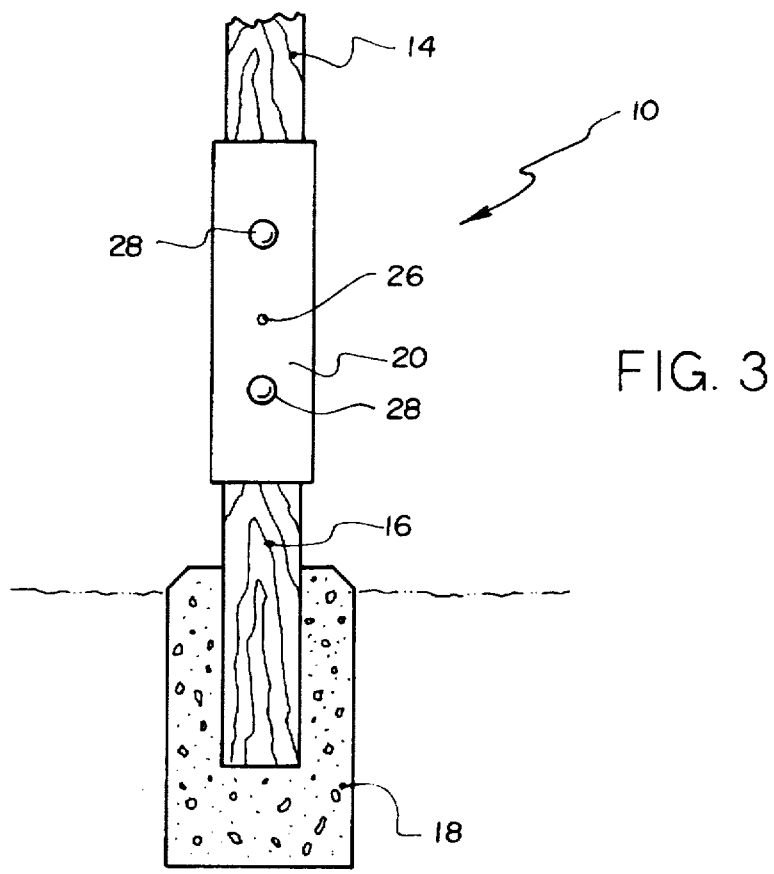
FIG. 3 is a side view of the present invention.
Figure 4:
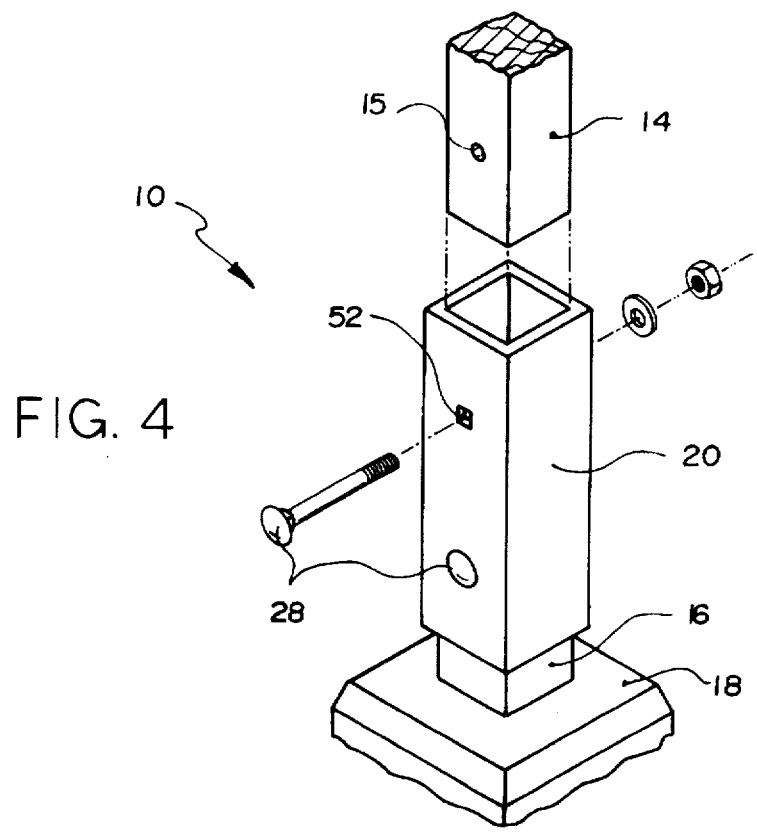
FIG. 4 is an isometric view of the present invention capturing the upper post.

With reference now to the drawings, and in particular to FIGS. 1 through 6 thereof, a new Breakaway Sign Post Repair System embodying the principles and concepts of the present invention and generally designated by the reference numeral 10 will be described.

More specifically, it will be noted that the Breakaway Sign Post Repair System 10 comprises a breakaway tube 20 formed to a shape that captures a sign post 12 broken into an upper post 14 and a lower post 16 secured to a post mount 18, thereby aligning said upper and lower posts 14, 16 into a parallel vertical position, the breakaway tube 20 comprises a material that breaks upon impact of a vehicle traveling at a substantial velocity, the upper post 14 including a upper aperture 15 near the lower end that engages the breakaway tube 20, the lower post 16 including a lower aperture 17 near the upper end that engages the breakaway tube 20, the breakaway tube 20 including an upper fastener aperture 52 and a lower fastener aperture 54 that correspond to the upper aperture 15 and the lower aperture 17, and two fasteners 28 projecting through the upper and lower aperture 17s to secure the upper post 14 and the lower post 16 to the breakaway tube 20.

Figure 5:
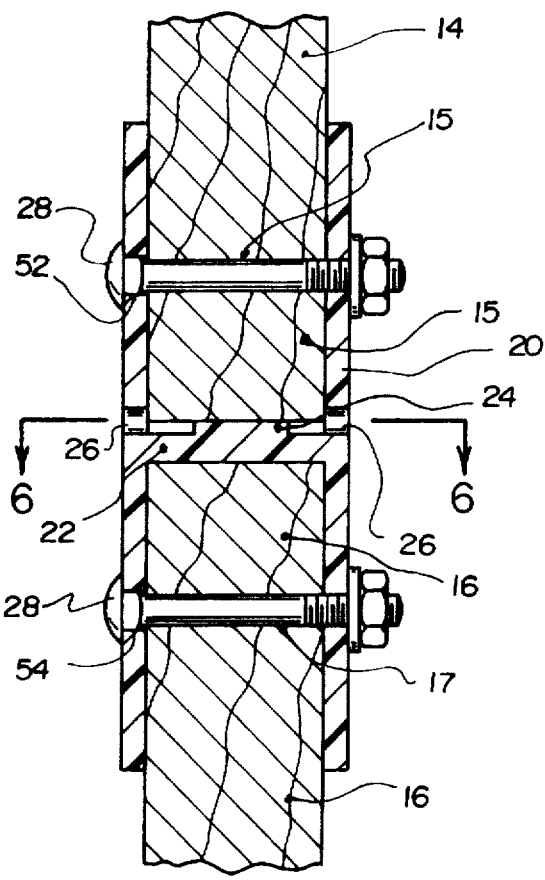
FIG. 5 is a cross sectional view taken along line 5—5 of FIG. 1.
Figure 6:
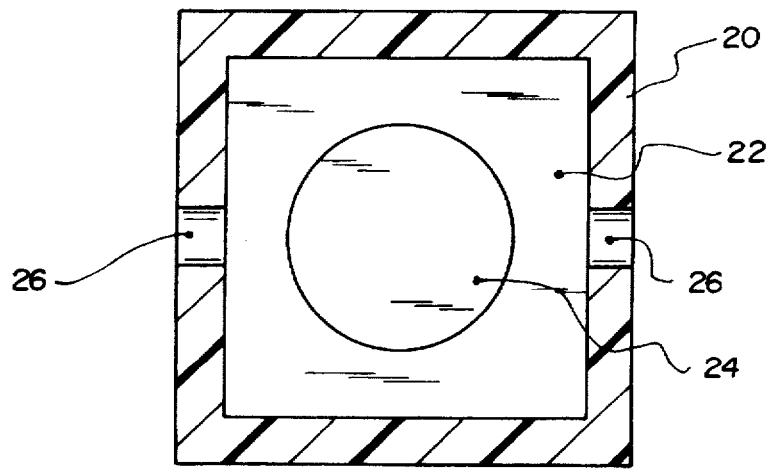
FIG. 6 is a cross sectional view taken along line 6—6 of FIG. 5.

As best illustrated in FIG. 5, it can be shown that the breakaway tube 20 has a horizontal partition 22 concentrically positioned within the lumen. The horizontal partition 22 separates the lumen into an upper lumen and a lower lumen that capture the respective upper and lower posts 16. As shown in FIGS. 5 and 6 of the drawings, a cylindrical member 24 is secured to the horizontal partition's 22 cornice. The cylindrical member 24 extends vertically upward a finite distance to engage the bottom end of the upper post 14 to separate the upper post 14 from the horizontal partition 22. As best shown in FIG. 5 of the drawings, the breakaway tube 20 has at least one drainage aperture 26 above the horizontally partition 22 and below the end of the cylindrical member 24 opposite of the horizontal partition 22 to drain accumulated water to prevent deterioration of the upper post 14. The breakaway tube 20 preferably is constructed from a rigid plastic.

In use, the breakaway tube 20 is secured to the lower post 16 by the fastener 28. The upper post 14 is then secured within the breakaway tube 20 where the end is juxtaposed to the cornice of the cylindrical member 24. Accumulated water within the upper post 14 and the breakaway tube 20 is drained through the drainage aperture 26 thereby preventing rotting and deterioration of the upper post 14. When a vehicle strikes the upper post 14, the breakaway tube 20 preferably breaks concentrically above the horizontal partition 22 thereby preventing severe damage to the vehicle and people nearby. The invention is specifically designed to repair broken sign posts 12 thereby eliminating the need to purchase and install a new sign post 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A breakaway signpost repair system for rejoining the upper and lower post portions of a broken signpost, said system comprising a breakaway tubular member having a perimeter wall defining a lumen and having an upper opening for receiving an upper post portion of a broken signpost and a lower opening for receiving the lower post portion of a broken signpost in a manner aligning said upper and lower portions into a longitudinally-aligned position, the breakaway tubular member comprising a horizontal partition extending completely across the lumen of the tubular member to separate the lumen into an upper lumen for receiving the upper post portion and a lower lumen for receiving the lower post portion; and the breakaway tubular member being comprised of a material adapted to break upon impact of a vehicle striking an upper post portion inserted into said breakaway tubular member;

the breakaway tubular member including an upper fastener aperture and a lower fastener aperture for receiving fasteners passing through the upper and lower post portions of a broken signpost;

a fastener for projecting through the upper fastener aperture and lower fastener aperture to secure an upper post portion and a lower post portion to the breakaway tubular member;

a cylindrical member secured to the horizontal partition of the breakaway tubular member and projecting vertically upward for engaging the bottom end of an upper post portion inserted in said breakaway tubular member to thereby space the bottom end of the upper post portion upward from the horizontal partition, said cylindrical member forming an annular groove between said cylindrical member and the perimeter wall of said breakaway tubular member; and at least one drainage aperture in said breakaway tubular member located above the horizontally partition and below the upper end of the cylindrical member opposite of the horizontal partition to drain accumulated water from said annular groove to prevent deterioration of the upper post portion of a signpost.

2. The Breakaway Sign Post Repair System of claim 1, wherein the breakaway tube comprises a rigid plastic.

* * * * *